April 15, 1947.　　　　T. CLARK　　　　2,418,967
MOUNTING OF WHEELS
Filed March 6, 1944
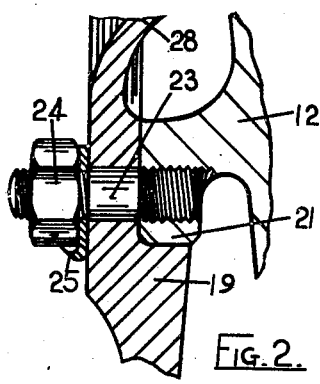
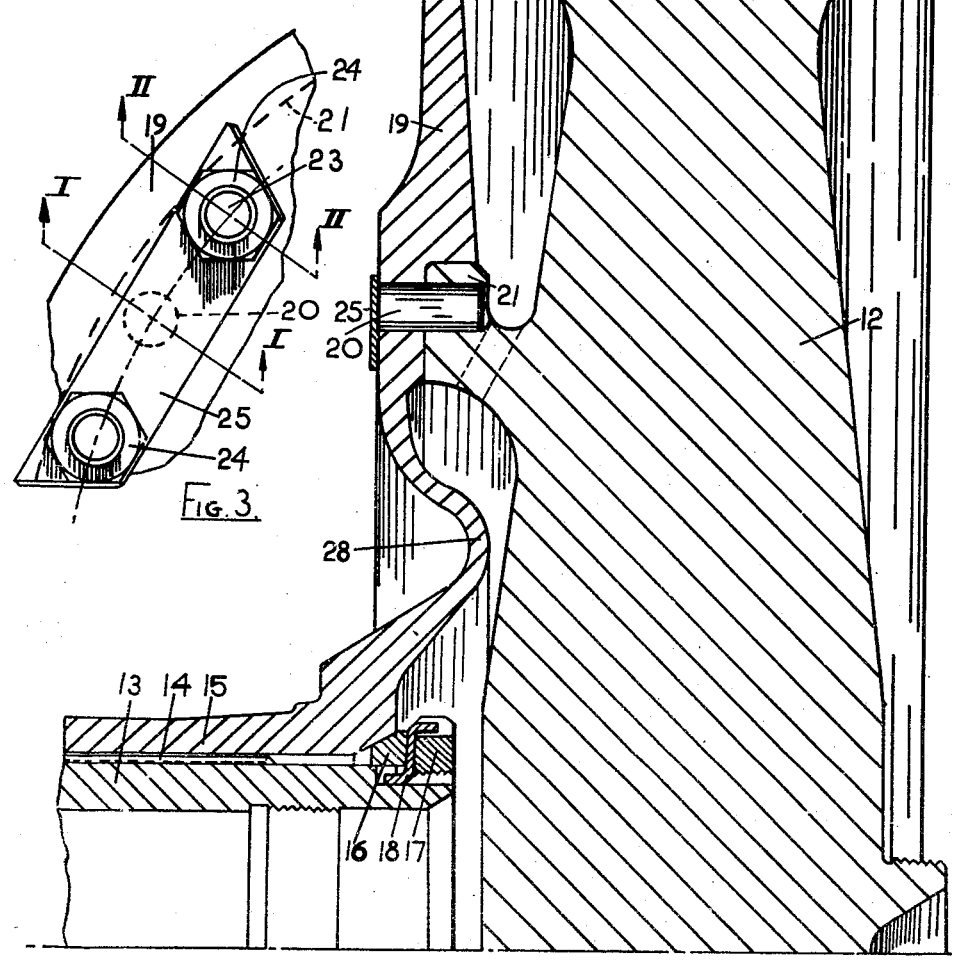
INVENTOR
Thomas Clark
BY
Loyd Hall Sutton
ATTORNEY Patented Apr. 15, 1947

2,418,967

UNITED STATES PATENT OFFICE 2,418,967

MOUNTING OF WHEELS

Thomas Clark, Coventry, England, assignor to Armstrong Siddeley Motors Limited, Coventry, England Application March 6, 1944, Serial No. 525,229
In Great Britain October 7, 1943

3 Claims. (Cl. 253—39)

This invention relates to the securing of a turbine or other wheel to a supporting flange, and, although not limited in this respect, it is particularly applicable to the supporting of a wheel of an elastic fluid turbine which may undergo material temperature changes, resulting in internal stresses arising, between the stationary and running conditions.

My main object is to provide an improved method of supporting a wheel so that it is better able to withstand such internal stresses as may arise from change of temperature.

According to the invention, the wheel is formed on one side with an integral flange adapted to spigot into and to be secured to a supporting flange, so that the wheel itself is not pierced to receive connecting bolts, studs or the like, as such holes are a source of weakness.

According to a further feature of the invention, the supporting flange is integrally connected by means involving a slight flexibility with a hub portion adapted to be secured upon a shaft. For preference the wheel flange is positioned approximately half way between the centre and the periphery of the wheel near where the stresses arising from the heating of the periphery are neutral.

In the accompanying sheet of drawings:

Figure 1 is a sectional elevation of half a turbine wheel supported from a shaft according to the invention, the section being taken on the line I—I of Figure 3;

Figure 2 is a fragmentary sectional elevation taken on the line II—II of Figure 3, except that Figure 2 is actually inverted; and Figure 3 is a fragmentary end view.

In the arrangement shown, 12 represents a turbine wheel and 13 the end of a shaft which is to support it. The shaft carries external splines 14 which coact with internal splines on a hub portion 15 which is endwise located upon the shaft, as by means including a conical washer 16, a locknut 17 and a locking device indicated at 18. The hub is fast with a main supporting flange 19.

The ordinary practice is to drill holes through the wheel in order that the latter may be directly bolted to the flange 19, but, in accordance with the present invention, the wheel is formed with an integral axially spaced radially extending flange 21 adapted to be a good spigot fit into the flange 19 and further located by fitting dowels 20, as shown, and the attachment of the wheel to the flange 19 is effected between the flanges 19 and 21, the latter being drilled as necessary.

For attachment purposes I show studs 23 secured in the flange 21 and extending through holes in the flange 19 to receive nuts 24 held in position by tab washers 25. The studs are arranged in a circle round the axis of the wheel, two adjacent studs sharing an elongated tab washer, as shown by Figure 3, which serves to locate an intermediate dowel 20 against endwise movement in one direction.

In the present instance the flange 21 is situated where the internal stresses, as the periphery becomes heated, are more or less neutral.

In view of the radial expansion which will occur as working temperatures are reached I prefer that the flange 19 should be connected with the hub portion 15 by means of an annular curved portion 28 which has a certain amount of flexibility, as will be well understood, thus relieving the hub 15 of stresses caused by the expansion of the wheel 12.

What I claim as my invention and desire to secure by Letters Patent of the United States is:

1. In combination, a shaft, a hub portion fast on said shaft, a radially-extending flange connected to said hub portion by an annular portion of wavy form to provide slight flexibility in a radial direction, a turbine wheel having on one side an integral radially-extending flange positioned approximately half way between the centre and the periphery of the wheel, said first-mentioned flange having an annular recess radially-outwardly of said wavy annular portion in which said wheel flange is a good spigot fit, and means securing said flanges together.

2. Means for rotatably mounting a wheel comprising a rotatable disc-like supporting flange having an annular, axial recess, a wheel having an axially extending portion terminating in a radially extending flange which has a spigot fit within said recess, and axially extending means for securing said wheel flange and supporting flange together.

3. Means for rotatably mounting a wheel comprising a shaft, a disc-like supporting flange carried by and rotating with said shaft, said flange having an annular axial recess and a wavy portion radially-inwardly of said recess providing flexibility in a radial direction, a wheel having an axially extending flange which has a spigot fit within said recess, and means for securing said wheel flange and said supporting flange together.

THOMAS CLARK.

REFERENCES CITED

The following references are of record in the file of this patent:

UNITED STATES PATENTS

| Number | Name | Date |
|---|---|---|
| 2,297,508 | Schutte | Sept. 29, 1942 |
| 2,047,501 | Wettstein | July 14, 1936 |
| 2,369,795 | Planiol et al. | Feb. 20, 1945 |
| 1,686,840 | Richard | Oct. 9, 1928 |